Dec. 27, 1949  F. K. PERKINS ET AL  2,492,178
SHIP'S STABILITY INDICATOR

Filed Oct. 17, 1945  3 Sheets-Sheet 1

INVENTORS
FRANK K. PERKINS
CHARLES S. TARR
WILLIAM L. MOREY
CHARLES W. MERRIAM, JR.

BY Ralph L. Chappell
ATTORNEY

INVENTORS
FRANK K. PERKINS
CHARLES S. TARR
WILLIAM L. MOREY
CHARLES W. MERRIAM, JR.
BY
ATTORNEY

Dec. 27, 1949　　F. K. PERKINS ET AL　　2,492,178
SHIP'S STABILITY INDICATOR
Filed Oct. 17, 1945　　　　　　　　　　　3 Sheets-Sheet 3

INVENTORS
FRANK K. PERKINS
CHARLES S. TARR
WILLIAM L. MOREY
CHARLES W. MERRIAM, JR.

BY Ralph L Chappell
ATTORNEY

Patented Dec. 27, 1949

2,492,178

UNITED STATES PATENT OFFICE 2,492,178

SHIP'S STABILITY INDICATOR

Frank K. Perkins, Newton, Charles S. Tarr and William L. Morey, Melrose, and Charles W. Merriam, Jr., Taunton, Mass.

Application October 17, 1945, Serial No. 622,919

4 Claims. (Cl. 73—65)

(Granted under the act of March 3, 1883, as amended April 30, 1928; 370 O. G. 757)

This invention relates to a device for indicating the stability of a structure floating in a fluid and more particularly the stability of a ship.

The latter is measured in terms of transverse GM, i. e., the distance between the ship's center of gravity (G) and the transverse metacenter (M) of that ship.

Among the many factors entering into the determination of the GM of a given ship are: Shape of the hull; distribution of fixed masses, cargo and the like; aggregate weight and possible shift in weight in tanks; live weight; etc. With the above and other factors known, an experienced marine architect may, by involved mathematical computation, determine a ship's theoretical GM.

Another method widely recognized for determining GM employs the formula:

$$GM \text{ equals } \left(\frac{KB}{T}\right)^2$$

in which:
K equals constant.
B equals beam in feet.
T equals time of one whole cycle of roll of the ship in seconds, i. e., for example, the time which it takes a ship to proceed from the extremity of the port roll to the extremity of the starboard roll and back to the former. It is a common practice upon completion of at least the first ship of a class to conduct an inclining experiment to determine among other things, the factor K in the above formula.

Although devices have been hitherto provided for indicating GM and for decreasing the amount of mathematical computations involved, it is believed that none of these prior devices are based upon the principle of measuring the time of a whole roll cycle of a ship as illustrated in the above formula or in a formula of a generally similar nature. Moreover, generally, these prior devices require the user to perform at least some mathematical computations and, for the most part, are involved, intricate mechanisms requiring multiple adjustments by the operator. Because of their inherent inaccuracies and the excessive maintenance and number of manipulations required, as well as the extensive training required for interpreting the results obtained, these devices are not accepted as satisfactory for the purposes of determining GM.

It is an object of the present invention to provide a stability indicator which will give a direct, accurate reading of GM, and that requires of the user substantially only the pushing of a single button to initiate its operation to obtain the desired GM indication.

Another object of the invention is to provide a device of this character with means for translating the period of time required for the ship to make one or more whole roll cycles to an indicator which in conjunction with a graduated dial, precomputed on the basis of the relationship between GM and the time required to complete a whole roll cycle or series of such cycles, indicates directly the existing GM of the ship.

It is a further object of the invention to provide in a device of this character an adjustable means to prevent operation of the device when the ship is rolling to a degree at which an accurate GM reading cannot be obtained.

It is a further object of the invention to provide in a device of this character a signal means to keep the operator informed of exactly that step of the operations which is being performed by the device during the roll cycle or cycles.

It is a further object of the invention to provide a device of this character which is rugged, durable and comprised of relatively few, simple and inexpensive parts, constructed and arranged to operate on ships having either an A. C. or D. C. electrical current source.

With the above and other objects and features in view, the invention will now be described with reference to the accompanying drawings which illustrate a preferred embodiment of the invention and will be pointed out in the claims.

In the drawings:

Fig. 5 is an electrical wiring diagram of the device, a slight possible modification of the structure being shown in dotted lines in the upper right-hand corner of this figure; and Fig. 6 is a detailed sectional elevation of the indicator restoring knob and its associated parts.

Figure 1:
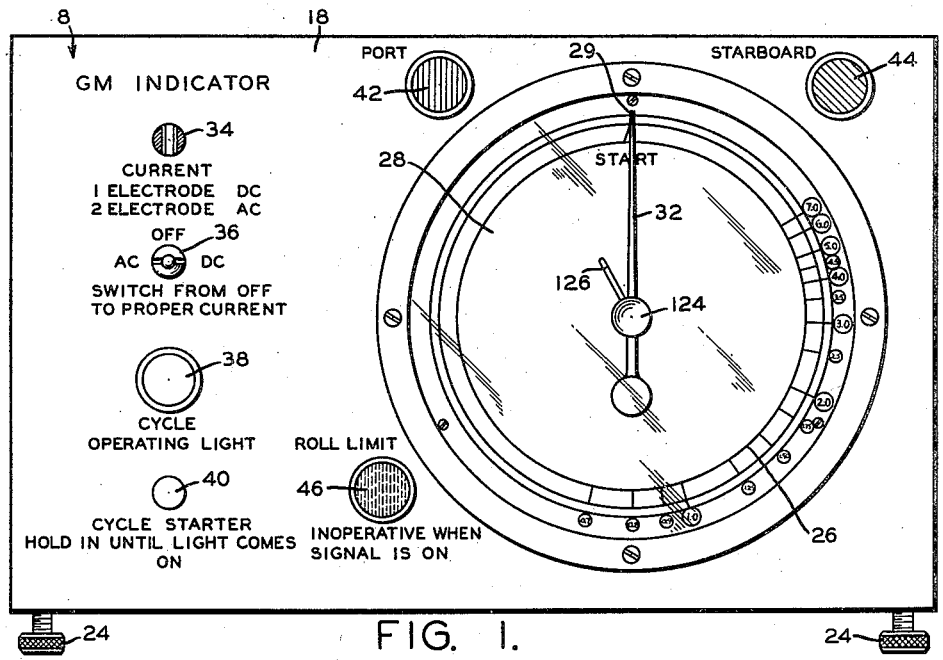
Fig. 1 is a front elevation of the GM indicator.

The device includes a rectangular case or housing 8 in which the various elements comprising it are mounted. The housing consists of a base 10, top 12, end walls 14 and 16, and front and rear panels 18 and 20, respectively. If desired, the device may have a carrying handle (not shown) secured to the top 12 to facilitate its portability. Centrally of the top is a bubble level 22 (Fig. 2) which in conjunction with leveling screws 24 threaded, in tripod arrangement, into the base 10 provides means for leveling the device on board a ship. Following this leveling operation, the device may be either secured to the structure of the vessel as a permanent fixture thereof, or, if it is desired to use the device only temporarily on different ships, a readily detachable fastening means may be employed.

On the right hand side of the panel 18 is a dial 26 spaced slightly to the rear of a circular cover 28 of glass or other transparent material fitted securely within the panel. The dial is preferably mounted in a manner whereby it is easily removable so that one dial may be substituted for another. The dial 26 is marked with designations representing potential GM's of a ship. Each of these designations is spaced from an origin or starting point 29 on the dial in accordance with the relationship which the period of time off a whole roll cycle, or a plurality of such cycles, bears to that ship's GM. A whole roll cycle may be defined as the length of time it takes a ship to roll in either direction (port or starboard) from any position to one extremity of the roll, thence to the opposite extremity, and back to the original position, or, the time it takes a ship to roll from one extremity of its roll to the other and back to the former. The GM designations are precomputed and plotted upon the dial for the particular class of vessel upon which it is intended to use the device and in accordance with the previously mentioned, GM formula:

$$GM \text{ equals } \left(\frac{KB}{T}\right)^2$$

With the appropriate dial for a particular ship predeterminately computed and calibrated as above described, it follows that the only remaining factor necessary to the determination of that ship's GM is the length of time it takes that ship to complete a single or multiple whole roll cycle program (depending upon whether the dial is plotted for a single or multiple number of whole roll cycles). By the determining of this time interval and transference of an indication thereof to the dial, a direct reading of that ship's GM may be taken.

For this time interval, measuring purpose, there is provided a mechanical clock 30 mounted within the housing 8 directly behind the dial 26. The clock is provided with a hand or indicator 32 that is movable by the clock from the starting position 29 around the dial 26 in front of the GM designations marked thereon. The clock is arranged to be started and stopped by means responsive to the roll of the ship and partially under the control of the "cycle starter" switch button 40 in a manner later to be described.

The device, in its preferred form, is arranged to be operated from a source of electrical current of either A. C. or D. C. type. Means is provided for indicating the type of current which is available at the source when the electric cord (not shown) of the device is plugged into an electrical outlet. This means comprises a neon tube 34 mounted on the front panel 18 and having two, separated electrodes. If, upon connecting the device, only one of the electrodes glows, D. C. current is indicated. Thus, the operator is signaled to move the operating switch 36 which is located directly beneath the tube 34, from its normal "off" position to the right, or "D. C." position. If on the other hand, both of the electrodes glow, an "A. C." source is indicated and this signals the operator to move the switch 36 from its "off" position, to the left, or "A. C." position.

Beneath the operating switch 36 there is mounted a "cycle operating light" 38, the purpose of which is to signal the operator that the device is in operation, i. e., that the time of a whole roll cycle or series of whole roll cycles is being measured. This light will come on at the beginning of and remain on, only during the period of the roll cycle measuring program. Immediately upon this light coming on, the operator is signaled that it is no longer necessary to hold the "cycle starter" button 40 depressed, it being necessary to press upon the button 40 in order to initiate the operation of the device.

In addition to the signal lights above described, there is mounted to the left and right of the upper portion of the dial 26, red and green, port and starboard lights 42 and 44, respectively. The purpose of these lights is to keep the operator informed of that step of the roll cycle measuring operation that is presently being performed during the sequence of the time interval measuring operation.

To the left of and toward the lower portion of the dial 26 there is a "roll limit" signal light 46. The purpose of this light is to notify the operator that the ship is rolling beyond that limit at which an accurate GM reading can be obtained, it having been found that when a ship's roll exceeds 15 to 30 degrees, a reading taken under these conditions is likely to be inaccurate because of the fact that the position of the ship's metacenter has shifted substantially. Upon this signal, the operator may advise the "skipper" so that he may accordingly change the course of the ship so as to cause a decrease in the ship's roll to that degree necessary to the taking of an accurate GM reading.

Experiment has established that by measuring the time it takes a ship to complete three whole roll cycles and applying this measurement to GM designations computed, plotted, and marked upon the dial 26 on this basis, gives maximum assurance of a higher degree of accuracy in the GM reading than when a lesser or greater number of whole roll cycles are measured. Accordingly, the embodiment of the invention herein disclosed is based upon the measurement of that period of time which it takes the ship to complete three whole roll cycles. It will be understood, however, that the time measuring mechanism of the device could be readily adapted to operate on the basis of only one whole roll cycle or any number thereof.

Figure 2:
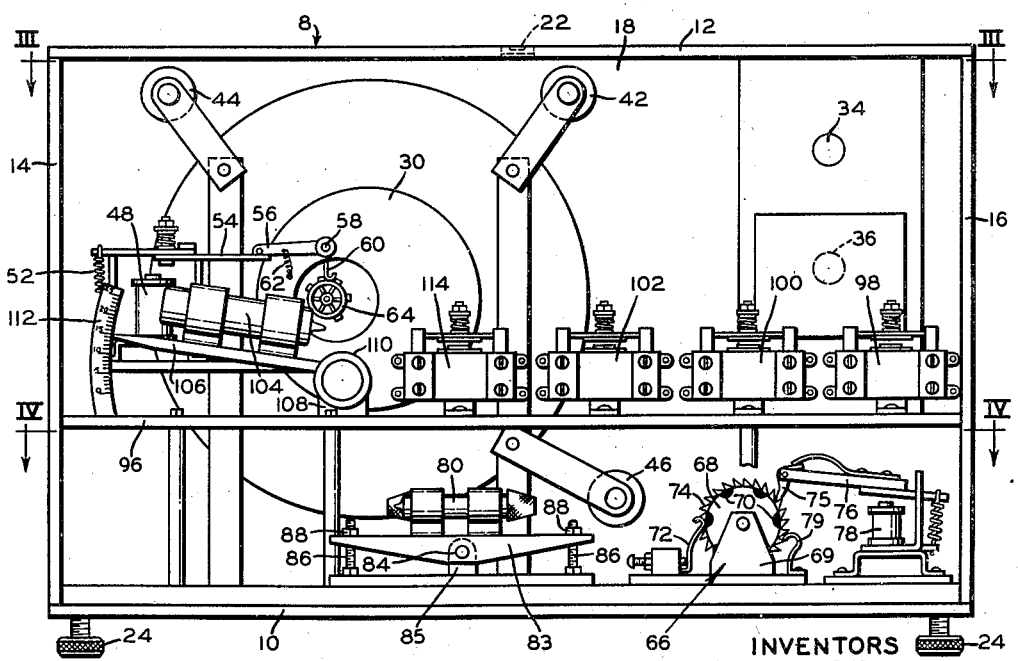
Fig. 2 is a rear elevation thereof with the rear panel of the housing removed.

The mechanism for precisely controlling the starting and stopping of the clock 30 in accordance with the beginning and ending of three whole roll cycles includes a release relay 48 mounted upon a bracket 50 secured in the housing 8. The armature of this relay is normally held open by a spring 52 (Fig. 2). Extending toward the right (Figs. 2 and 3) from the armature is a lever 54 which engages a lever 56 secured to a pin 58 pivoted in the back of the clock 30. The inner end of the pin 58 has secured thereon, a depending brake arm 60. A spring 62 inferior to the spring 52 normally tensions the arm 56 counter-clockwise into engagement with the lever 54. When the relay 48 is deenergized and the lever 54 is in its upper position, it serves to hold the lever 56 in the position shown in Fig. 2, and thereby causes the brake arm 60 to bear lightly against the periphery of a balance wheel 64 of the clock 30, thus holding the clock stopped. When the relay 48 is energized the downward movement of lever 54 permits the lever 56, under the action of spring 62, to swing counter-clockwise a distance sufficient to cause the brake arm 60 to be moved out of engagement with the balance wheel 64, whereupon the clock starts to operate.

Figure 4:
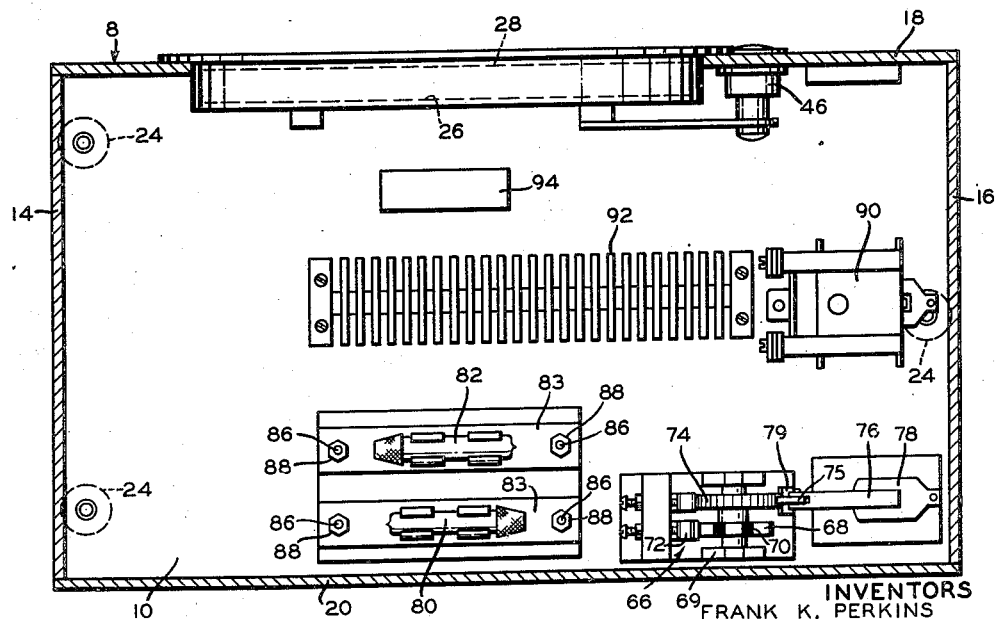
Fig. 4 is a sectional plan view taken on the line IV—IV of Fig. 2.

The energization and deenergization of the relay 48 is under the control of a rotary type, segment switch generally indicated at 66 (Figs. 2 and 4). This switch is mounted on the base 10 of the housing 8 and comprises a metal disc 68 rotatably mounted on a bracket 69. Insulating segments 70 are mounted in spaced relation in the disc and a wiper contact 72 is arranged to bear against its periphery. A toothed ratchet wheel 74 fixed to the disc is engaged by a feed pawl 75 pivotally supported on an armature lever 76 of a rotary switch relay 78.

Upon energization of relay 78 the pawl 75 moves downwardly a distance sufficient to advance the ratchet wheel 74 and disc 68 one tooth space. The spacing between the insulating segments 70 is such that four successive tooth space movements of the disc are required to advance the next adjacent insulating segment 70 into engagement with the wiper contact 72, the first step of movement corresponding to the first whole roll cycle, the next step to the second, the next step to the third, and the fourth step brings the switch back to its normal or starting position. A yielding detent 79 engaging the ratchet wheel prevents casual rotation thereof and makes positive its step by step advance.

To the left of the rotary switch 66 there is mounted on the base 10, "port" and "starboard" roll, mercury switches 80 and 82, respectively. Each of these switches is fixed on an adjustable supporting member 83. Each member 83 is pivotally mounted intermediate its ends as at 84 to an upstanding lug 85. The outer ends of each member 83 have passing therethrough, with clearance, upstanding studs 86 upon which are threaded, nuts 88. By this construction the switches 80 and 82 may be independently tilted by rocking their corresponding member 83 on its pivot 84. Following such adjustment, the switches may be locked in adjusted position by taking up on the nuts 88. By this means the switches 80 and 82 may be very finely adjusted to be effectively responsive to an extremely slight degree of roll, i. e., for example, a roll as slight as 2°.

There is a certain amount of vibration aboard a ship due to the running of its engines. Since this vibration is likely to cause intermittent and undesirable making and breaking of the switch points as the mercury responds to the vibration, it is necessary to provide positive electrical contact means that will take over, and continue, the operation of the electrical circuit in a proper manner, immediately upon the establishment of such circuit by the mercury switch. For this purpose there is provided an anti-chatter relay 90 mounted upon the base 10. The mode of operation of this relay in the circuit will hereinafter appear.

To the left of the relay 90 there is also mounted on the base 10, a rectifier 92 and a condenser 94, for rectifying A. C. current to D. C. current when the former is indicated by the current indicator tube 34.

Figure 3:
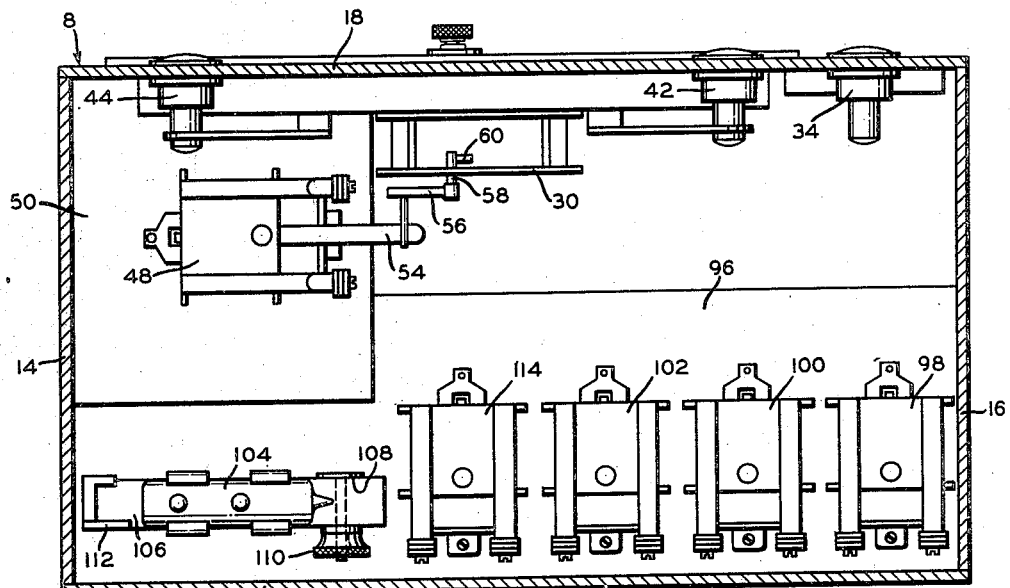
Fig. 3 is a sectional plan view taken on the line III—III of Fig. 2.

Referring now to Figs. 2 and 3, a shelf 96 is secured in the housing 8 above the base 10. On this shelf are mounted a starboard light relay 98, a set-up relay 100, and a control relay 102. The purposes and functions of such relays will be hereinafter explained in connection with the electrical circuit. Also supported on this shelf is a roll limit mercury switch 104. The mounting for this switch comprises an arm 106 pivotally mounted at its right end on a bracket 108. The arm is adjustable angularly on its pivot and is arranged to be locked in any adjusted position of inclination by a knurled nut 110. The left end of the arm has a pointer cooperating with a gauge 112 upon which are marked varying degrees of inclination. By adjusting the left end of the arm 106 upwardly or downwardly, the switch may be set to such an angular position that it will be responsive only when the ship is rolling beyond a limit wherein a proper GM reading can be taken. This switch operates a roll limit relay 114 mounted on the shelf 96 immediately to the right of the switch. The relay 114 is incorporated in the electrical circuit in such manner that it prevents operation of the device whenever it is energized by closure of the roll limit switch contacts as will appear from the electrical circuits now to be described.

As previously stated the electric cord of the device may be plugged into an electrical outlet of either A. C. or D. C. source. Referring to Fig. 5, the neon, current indicating tube 34 is wired directly across the line. If one electrode glows, the double pole, double throw, operating switch 36 is thrown to the "D. C." set of points for carrying the current directly to the current lines 116 and 118. If the two electrodes of the tube 34 glow, the switch 36 is thrown to its other, or "A. C." set of contacts, thereby causing the current to flow first through the rectifier 92 and thence to the lines 116 and 118. The purpose of the condenser 94 across the rectifier circuit is to sustain voltage. For convenience in describing and understanding the various circuits, the line 116 shall be considered as positive and one side of the line, and the line 118 as negative and the other side of the line.

Assuming that the cycle switch 40 is depressed to close its contacts and that following this, the first roll of the ship is to starboard, no circuits will be established even when the points of the starboard mercury switch 82 close during this roll. This is so because of the fact that the circuit is arranged so that it is necessary for the No. 1 and No. 2 contacts of the set-up relay 100 to close before a time-interval measuring operation can be initiated, and the set-up relay 100 is so wired in the circuit that, in order to energize it and thereby close its contacts, the ship must first roll to port with the cycle switch 40 held closed. Assuming now, that the ship has rolled to port with the switch button 40 held depressed, the current flows from the line 116 through the points of the switch 40, the normally closed, No. 2 contacts of the roll limit relay 114, the control relay 102, the points of the port roll switch 80, thence directly to the other side of the line, i. e., 118. This energizes the control relay 102 and closes its No. 1 contacts and opens its normally closed No. 2 contacts. The closing of the No. 1 contacts energizes the set-up relay 100, thereby closing its normally open, No. 1 and No. 2 contacts. The No. 1 contacts of the set-up relay are wired across the lines 116 and 118, in series with the coil of the set-up relay 100 in such manner that they establish a "hold" circuit for this relay 100 and maintain the relay energized independently of the port roll switch 80 and control relay 102 following its energization by these elements. Closing of the No. 2 contacts of the set-up relay 100 renders the line 119 positive. Incident to the energization of the control relay 102, the port roll light 42, which is wired in parallel with this relay, lights and remains lighted only so long as the port roll switch 80 remains closed. When this latter opens, the control relay 102 and light 42 are deenergized.

On the next succeeding roll to starboard, when the starboard switch 82 closes, the current flows from the line 119, through the points of the starboard switch 82, the normally closed contacts of the starboard light relay 98, the rotary switch relay 78, the normally closed No. 2 contacts of the control relay 102, and out to the other side of the line. At the same time, the current flows from the line 119 through the anti-chatter relay 90, the normally closed contacts of the starboard light relay 98, the starboard light 44, the normally closed No. 2 contacts of the control relay 102 and out to the other side of the line. Energization of the anti-chatter relay 90 closes its normally open, No. 1 and No. 2 contacts whereupon, the No. 1 contacts establish a holding circuit for the rotary switch relay 78 and the anti-chatter relay 90. The No. 2 contacts of the relay 90 energize the starboard light relay 98.

Energization of relay 98 opens its normally closed contacts, thus placing the starboard roll indicator light 44 directly under the control of the starboard roll switch 82 and rendering its control independent of the anti-chatter relay 90. Energization of the rotary switch relay 78 advances the ratchet wheel 74 one tooth space, to move the insulating segment 70 on the disc 68 away from the wiper contact 72, so that the latter now contacts the metal portion of the disc 68 and current passes from the line 119 through the wiper contact 72, the disc 68, release relay 48, and out to the other side of the line. This energizes the release relay 48 which operates lever 54 to start the clock in the manner hereinbefore described and also closes the normally open contacts of the release relay. Closure of these contacts causes current to flow therethrough from a line 120 connected to the line 116, but bypassing the push button switch 40, hence, the swotch 40 may now be released and the circuit for the energization of the anti-chatter relay 90, set-up relay 100, starboard light relay 98, and rotary switch relay 78 will be held closed by the release relay contacts. Simultaneously with the energization of the release relay 48, the light 38 which is wired in parallel therewith lights to signal the commencement of the roll cycle measuring program.

On the next succeeding roll to port, upon the port roll switch 80 again closing, the control relay 102 is again energized and the port roll light 42 simultaneously lighted. Energization of the control relay 102 opens the normally closed No. 2 contacts thereof. This causes the starboard light relay 98, anti-chatter relay 90 and rotary switch relay 78 to be deenergized. Deenergization of the rotary switch relay 78 permits the pawl 75 to rise and engage the next tooth of the ratchet wheel 74. The circuit through the release relay 48, however, remains established and the set-up relay 100 is held energized by the closed points of the release relay and contact 72 engaging a metal portion of disc 68, therefore, the cycle operating light 38 remains lighted, and the clock 30 continues to measure the time interval of the roll cycle program.

Upon the next roll back to starboard (which roll completes the first whole roll cycle) the port roll switch 80 opens, deenergizing the control relay 102 and the port roll light 42. Upon deenergization of the control relay 102, its normally closed No. 2 contacts close in readiness to complete the circuit to the starboard light relay 98, anti-chatter relay 90 and rotary switch relay 78 when the starboard switch 82 next again closes. Closure of the starboard switch points 82 causes reperformance of the operations above described including the advancement of the ratchet wheel 74 one additional tooth step of movement.

Further rolls to port and starboard will repeat the operations above described until, at the end of the third whole roll cycle, advancement of the ratchet wheel 74 an additional tooth space brings the wiper contact 72 again into contact with an insulating segment 70. Immediately upon this happening, the circuit to the release relay 48 is opened, the relay 48 and light 38 deenergized, and lever 54 is raised to stop the clock 30. Simultaneously, by the opening of the release relay contacts, the set-up relay 100 is deenergized and the circuits to the remaining relays are thus opened, leaving the device in readiness for the measurement of another three whole roll cycle program.

The electrical circuit for the means for preventing time measurement operations to be performed when the ship is rolling beyond a limit at which an accurate GM reading may be obtained, will now be described. This means includes a roll limit switch 104 and the roll limit relay 114. If the ship is rolling beyond the critical limit (15 to 30 degrees) even though the starter button 40 is held depressed, the device will not operate because the points of the switch 104 will be closed on the excessive port roll. Closure of these points energizes the roll limit relay 114 causing its normally open No. 1 contacts to close and its normally closed No. 2 contacts to open.

The No. 1 contacts of this relay merely provide a holding circuit therefor until the port roll switch opens on its return from the excessive port roll. The No. 2 contacts of this relay are interposed in the circuit to the control relay 102 which, it will be remembered, it is necessary to energize in order to effect operation of the set-up relay 100 to start the device in operation. Therefore, it follows that, whenever the No. 2 contacts of the roll limit relay 114 are open the device cannot be operated. Simultaneously, with the energization of the roll limit relay 114, the roll limit light 46 which is wired in parallel with the relay 114, is lighted to signal the operator that an excessive roll condition exists.

Before commencing a roll cycle measuring program, it is necessary that the indicator 32 which has been advanced over the dial 26 during the preceding time interval measuring program be restored to its normal or starting position indicated at 29 in Fig. 1. For this purpose, there is provided a spring retained, push button 124 (Figs. 1 and 6) suitably mounted centrally in the cover 28. The inner end of the shank of this push button has fixed thereto an offset finger 126 which, when it occupies its normal position, i. e., with the button 124 undepressed, has sufficient clearance between its inner end and the indicator 32 to prevent interference with rotating movement of the latter. When, however, it is desired to reset the indicator 32, it is only necessary to push inwardly on the knob 124 until the offset of the finger 126 lies in the plane of the indicator, whereupon, by rotating the knob the indicator may be readily restored to the starting position 29.

A modified form of the device is illustrated by a dotted line representation at the upper right-hand side of Fig. 5. If it is desired to construct the device so that it will operate on A. C. current only, the mechanical clock 30 is replaced by an A. C. synchronous motor driven, electric clock. In making this substitution, the lever 54 is removed from the armature of the release relay 48 and, an additional set of normally open contacts 128 are provided on this relay. The motor 130 of the electric clock is connected in the circuit as follows: From the line 119 through the contacts 128, through the motor, and to the line 118. Hence, upon energization of the release relay 48, as contacts 128 close, the circuit to the A. C. clock motor 130 is closed and the clock commences to time the roll cycle program. Conversely, upon deenergization of the release relay 48, as the contacts 128 open, the A. C. clock is stopped at the end of the third whole roll cycle of the program. The conventional A. C. type of clock is provided with an indicator resetting solenoid indicated at 132. This solenoid is connected in the circuit as follows: From the line 120 through the solenoid to one of a pair of contacts of a make, push button switch 134. The other contact of the switch 134 is connected to the line 118. To reset the indicator of the A. C. type of clock it is only necessary to close the contacts of the switch 134 by pushing on its button. When this exclusively, A. C. current, form of the device is constructed, obviously, the mechanical resetting mechanism 124-126 shown in Fig. 6 is omitted and the rectifier 92 and condenser 94 (Fig. 5) are eliminated from the circuit. In addition, a double pole, single throw, switch is substituted for the double pole, double throw, switch 36 shown in Fig. 5 and all of the D. C. type relays which have heretofore been described are replaced by exactly similar relays but of an A. C. current operated type. Apart from the foregoing, the operational characteristics of the device are precisely the same as has been described in connection with the A. C. or D. C. current operated type of device.

The invention described herein may be manufactured and used by or for the Government of the United States of America for government purposes without the payment of any royalty thereon or therefor.

Having described the invention what is claimed as novel and desired to be protected by Letters Patent of the United States is:

1. A portable device for indicating the stability of a ship comprising, a carrying case, a dial being secured to said case and marked with designations of the potential GM's of the ship, each of which designations is spaced from an origin in accordance with the relationship which time of a whole roll cycle bears to that GM, an indicator associated therewith, a clock mechanism for translating the time interval required for a whole roll cycle of the ship to said indicator, an electric circuit including a relay, said relay upon energization being operable to start said clock mechanism, a first mercury switch mounted on said case and having contacts therein adapted for closure upon the rolling of said ship in one direction, said first relay becoming energized upon a first closure of said first switch, a commutator switch connected in circuit with said relay maintaining the said relay energized for a predetermined number of closures of said first mercury switch whereupon said relay is deenergized and stops said clock mechanism, and an adjustable roll limit switch comprising a second mercury switch connected in said circuit and mounted at a predetermined angle on said case and responsive to the roll of the ship to disable said circuit thereby to prevent operation of the clock mechanism when the ship rolls beyond the limit at which an accurate GM reading may be obtained.

2. Portable apparatus for indicating the stability of a ship comprising, a carrying case, a dial secured to said case being calibrated with spaced GM designations based upon the relationship which time bears to GM, an indicator associated with said dial, a normally inoperative clock mechanism secured to said case and coupled to said indicator for measuring the time interval required for the ship to complete a predetermined whole roll cycle program, a relay operative upon energization to start said clock mechanism, a first mercury switch mounted on said case and connected in circuit with said relay, said first switch being adapted to close said circuit to energize said relay upon the rolling of said ship a predetermined amount in a predetermined direction, and an electro-mechanical switch connected in circuit with said mercury switch and said relay operable to deenergize said relay upon the completion of said predetermined whole roll cycle program, the deenergization of said relay being effective to stop said clock mechanism.

3. Portable apparatus for indicating the stability of a ship comprising, a carrying case, a dial secured to said case being calibrated with spaced GM designations based upon the relationship which time bears to GM, an indicator associated with said dial, a normally inoperative clock mechanism secured to said case and coupled to said indicator for measuring the time interval required for the ship to complete a predetermined whole roll cycle program, means for starting and stopping said clock mechanism at the beginning and end, respectively, of said program, said last-mentioned means comprising, a brake normally contacting said clock mechanism to prevent operation thereof, a first relay, said first relay upon energization releasing said brake, a commutator switch having alternate conducting and insulating segments spaced in a predetermined manner, a second relay, said second relay being operative upon energization to drive said commutator switch a predetermined amount for each whole roll of said ship, and a first mercury switch mounted on said case, said mercury switch having contacts therein adapted to be closed upon the rolling of said ship in one direction, said mercury switch upon closure causing said second relay to be energized.

4. Portable apparatus for indicating the stability of a ship comprising, a carrying case, a dial secured to said case being calibrated with spaced GM designations based upon the relationship which time bears to GM, an indicator associated with said dial, a normally inoperative clock mechanism secured to said case and coupled to said indicator, means for starting and stopping said clock mechanism at the beginning and end, respectively, of a predetermined program of whole roll cycles, said means including, in an electrical circuit, a first relay being operative upon energization to start said clock mechanism, a commutator switch maintaining said first relay energized during said predetermined program, a second relay operative upon energization to rotate said commutator switch a predetermined amount for each whole roll of said ship, a first mercury switch connected in said circuit, said first mercury switch having contacts therein adapted to be closed upon the rolling of said ship in one direction and opened upon the rolling of said ship in the other direction, said second relay being energized while said first mercury switch is closed, and a second mercury switch connected in said circuit and mounted at a predetermined angle on said case, said second mercury switch having contacts therein adapted to be closed upon the rolling of said ship beyond a predetermined limit in said one direction, said second mercury switch upon closure disabling said circuit to prevent operation thereof.

FRANK K. PERKINS.
CHARLES S. TARR.
WILLIAM L. MOREY.
CHARLES W. MERRIAM, Jr.

REFERENCES CITED

The following references are of record in the file of this patent:

UNITED STATES PATENTS

| Number | Name | Date |
|---|---|---|
| 1,859,546 | Wilson | May 24, 1932 |
| 1,860,345 | Wilson | May 24, 1932 |
| 2,341,563 | Kreitner et al. | Feb. 15, 1944 |